UNITED STATES PATENT OFFICE.

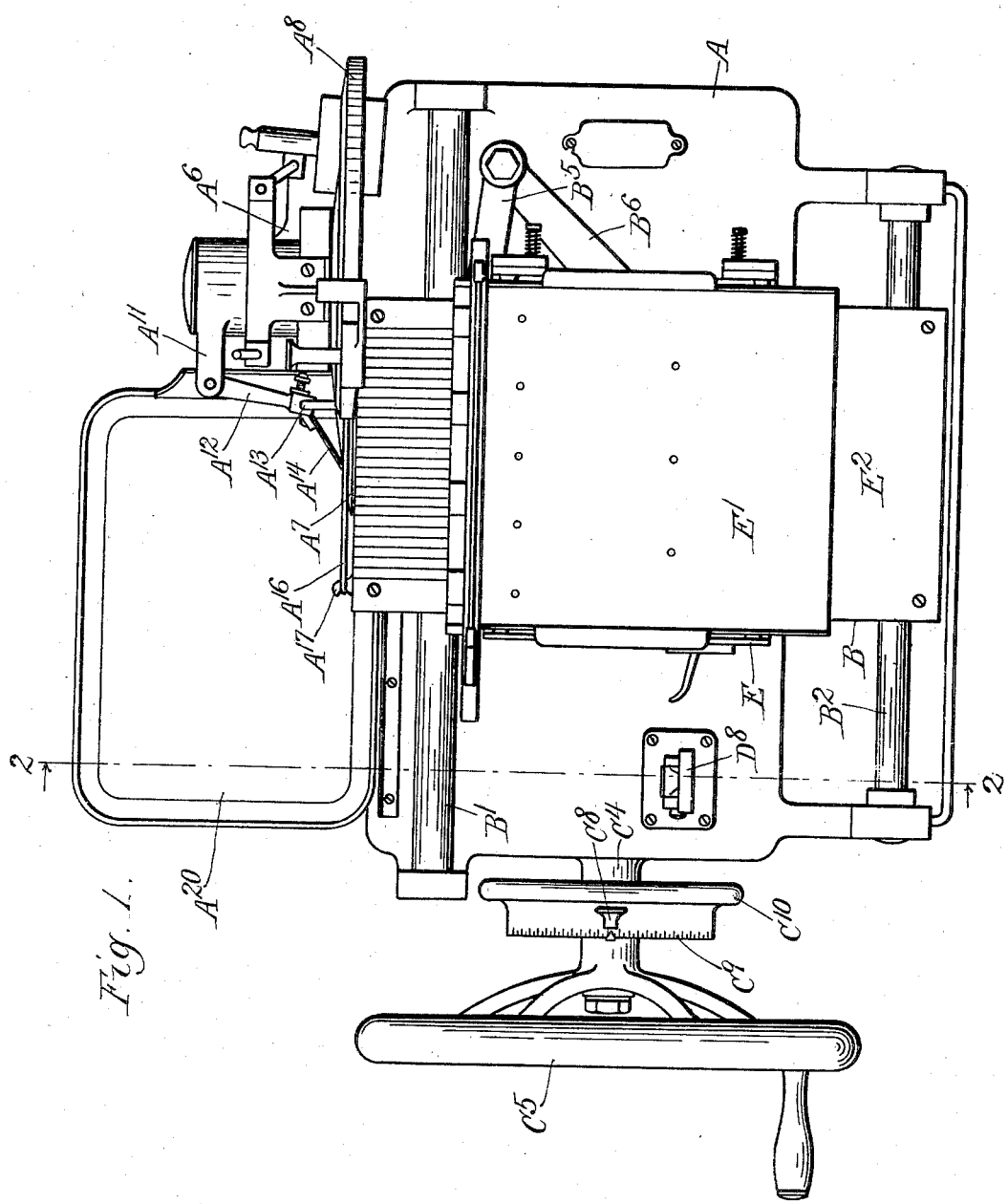

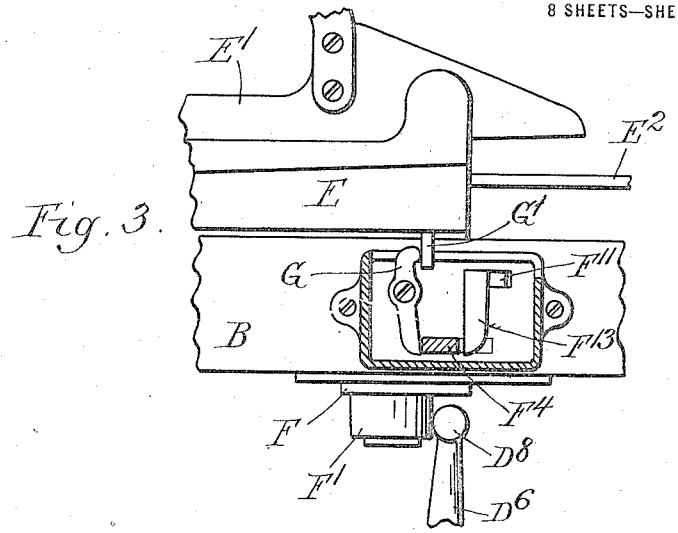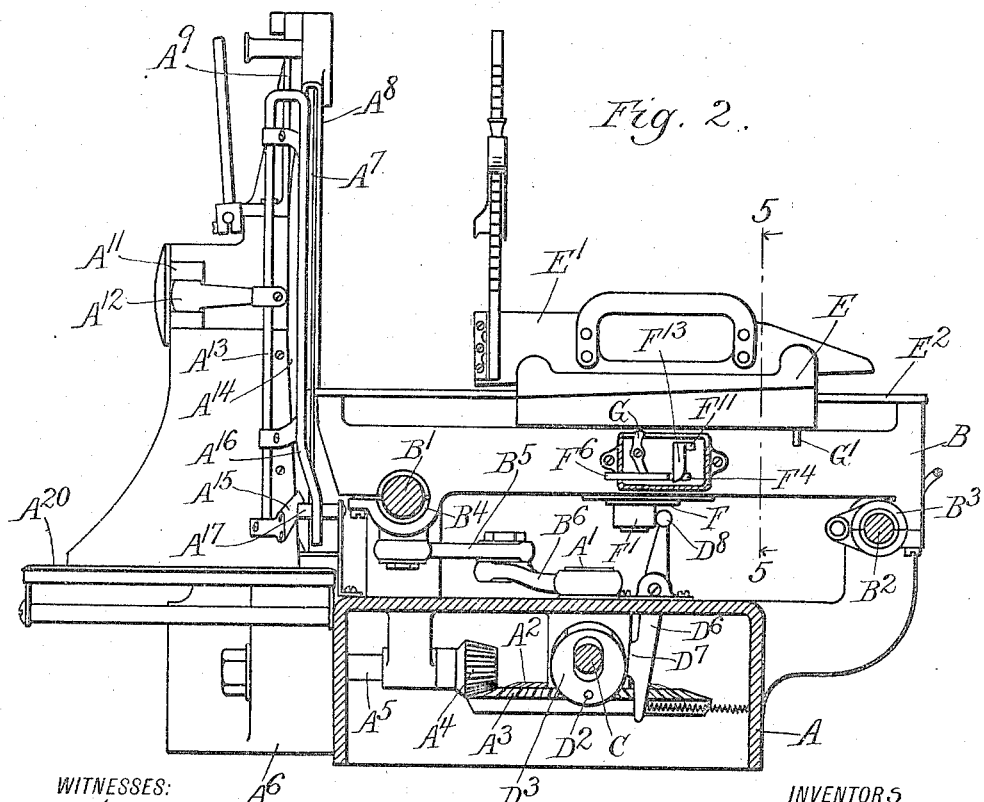

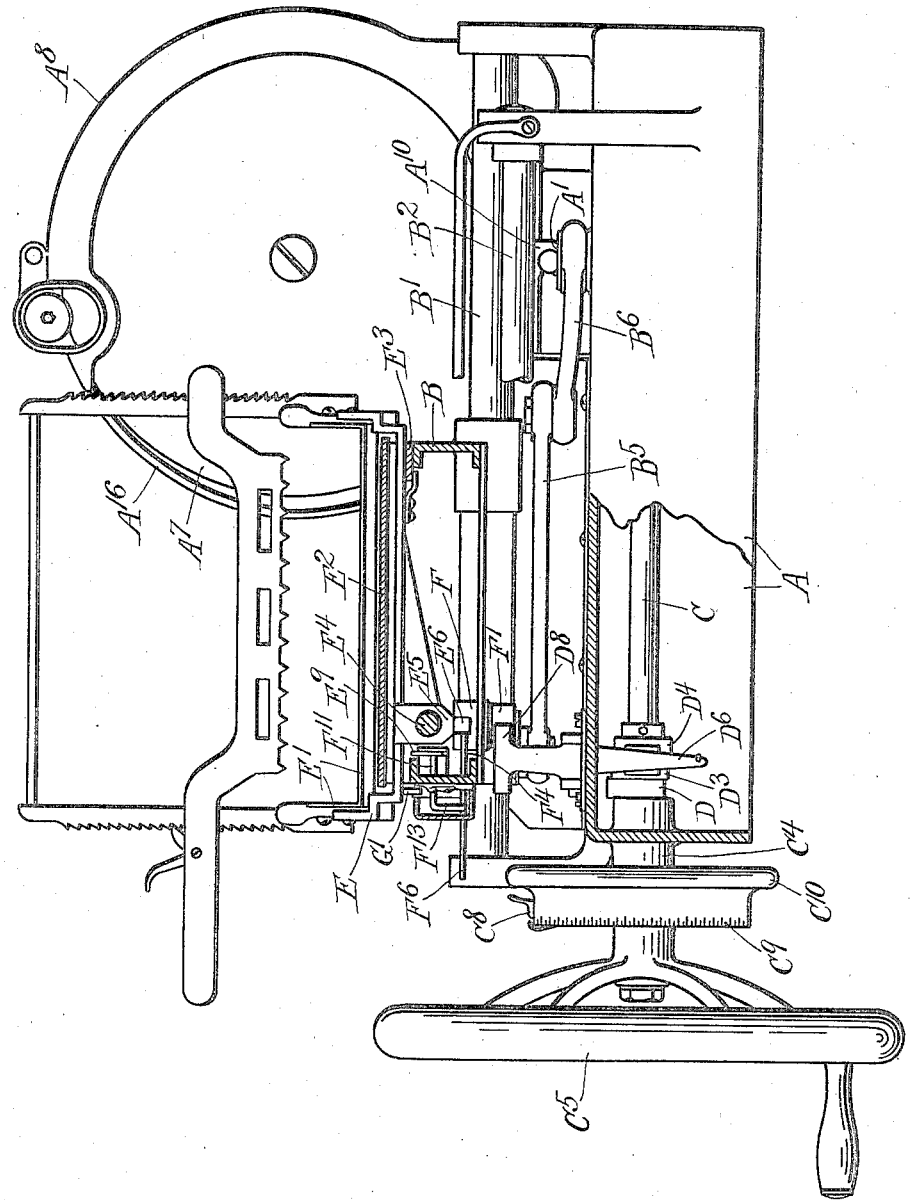

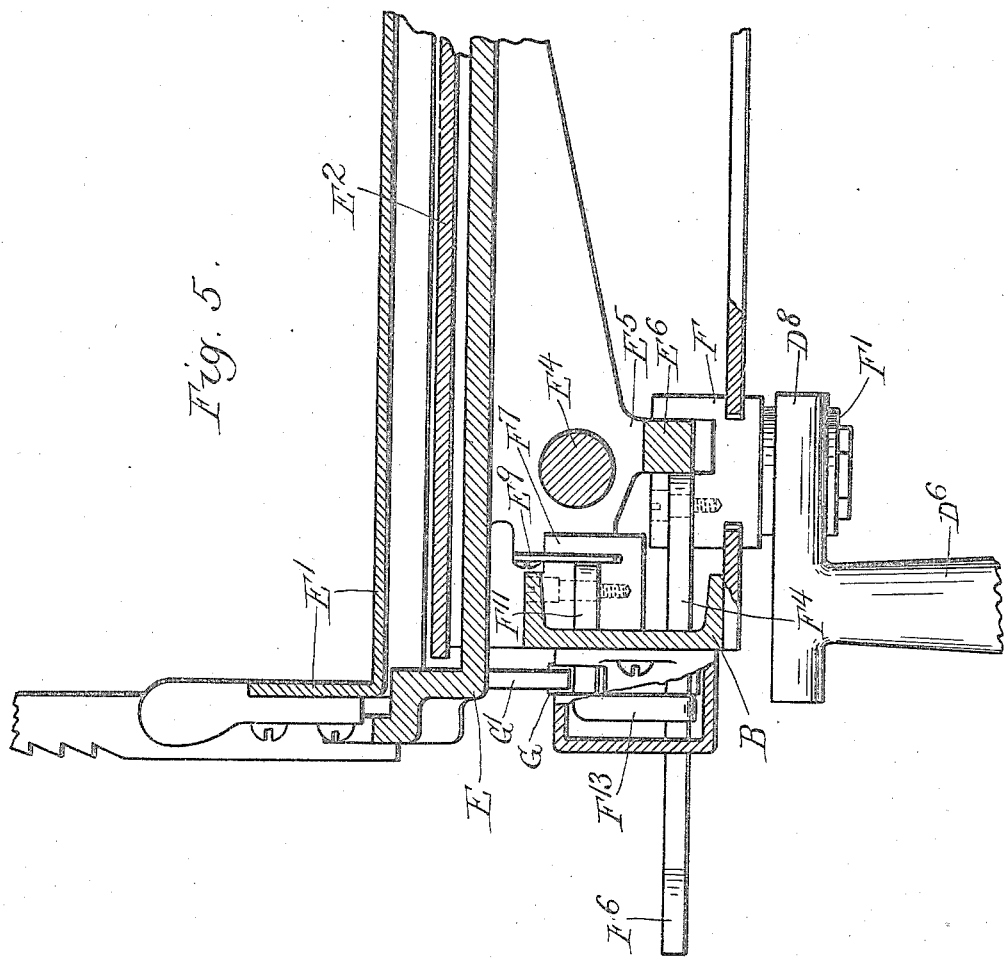

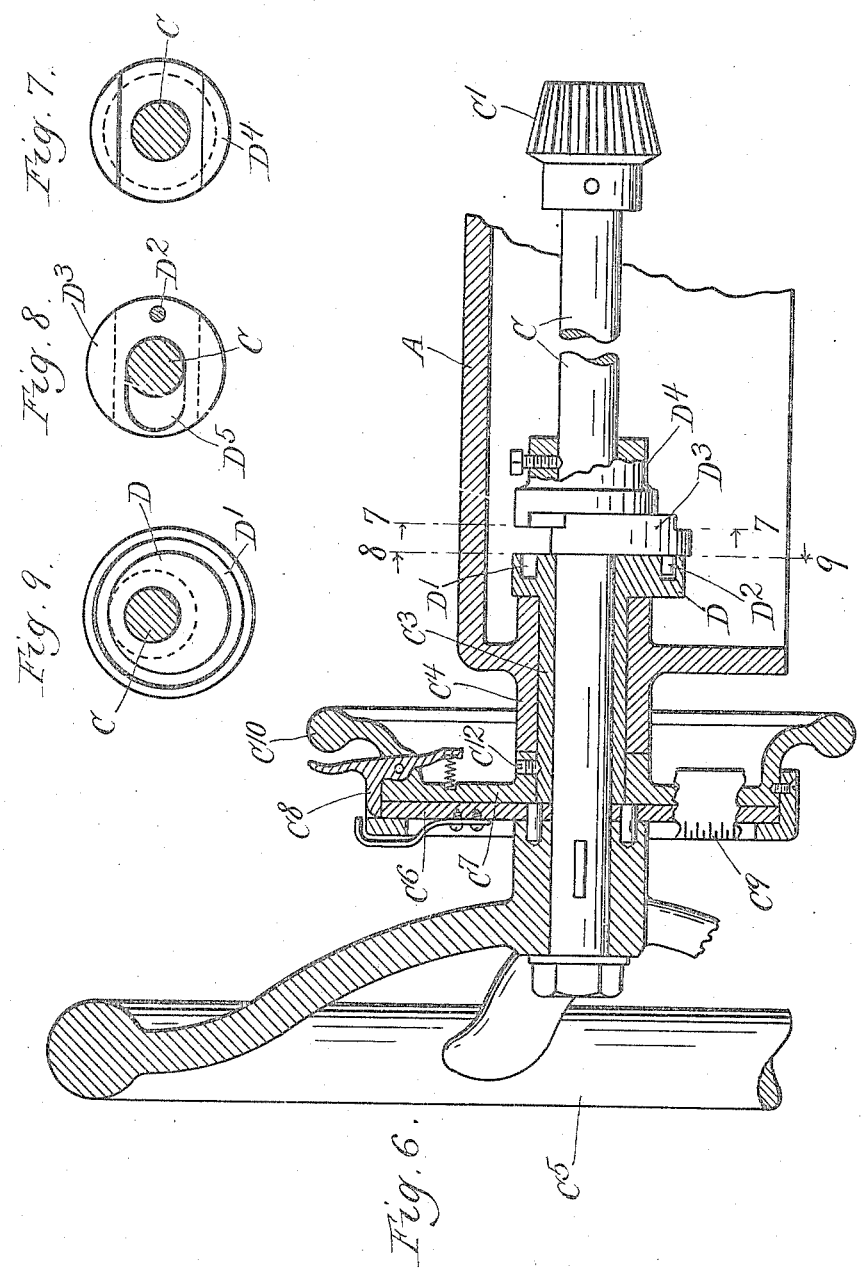

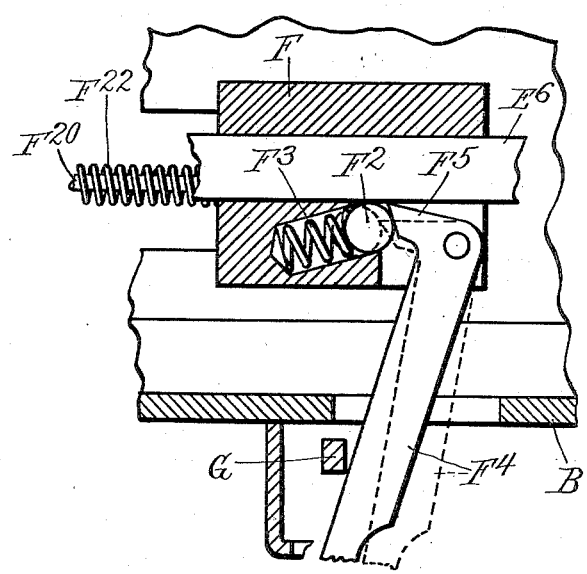
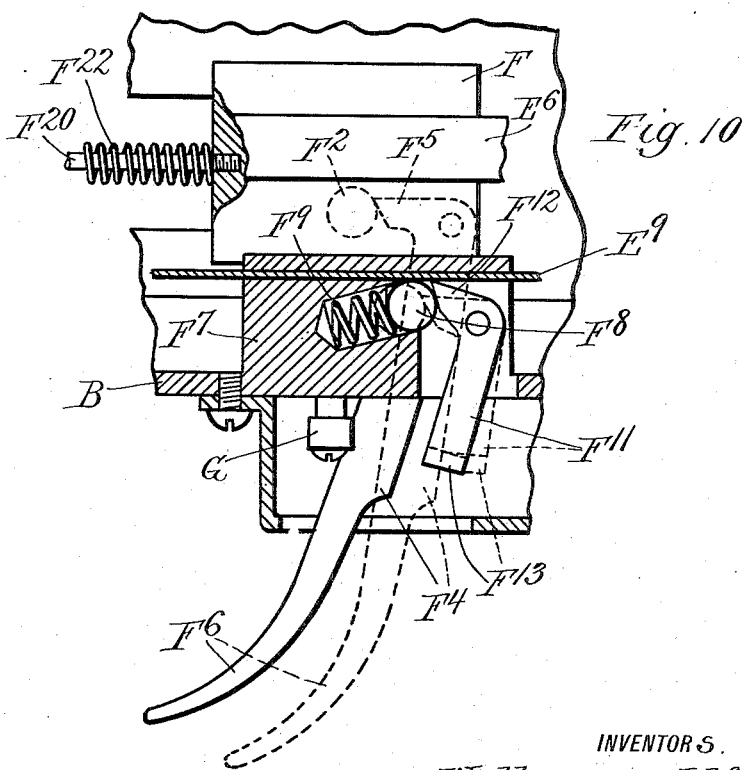

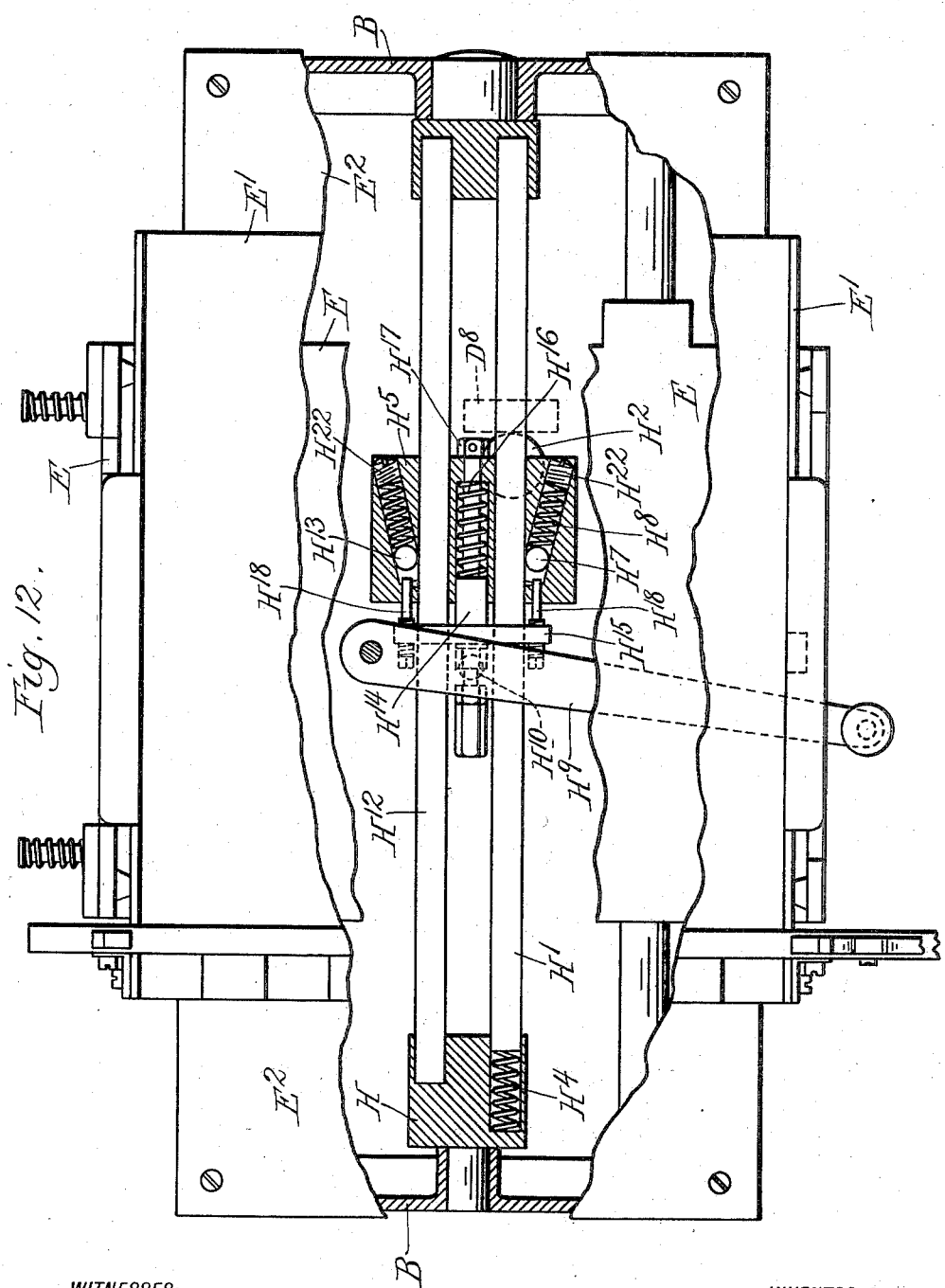

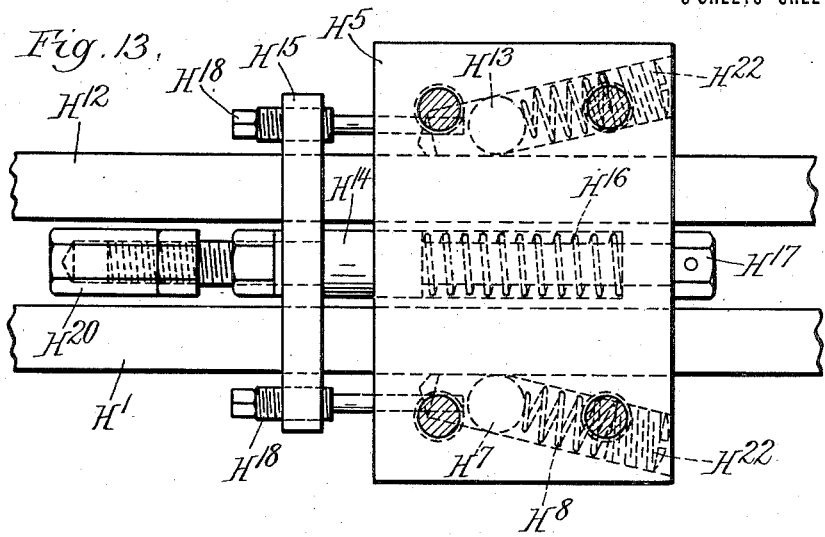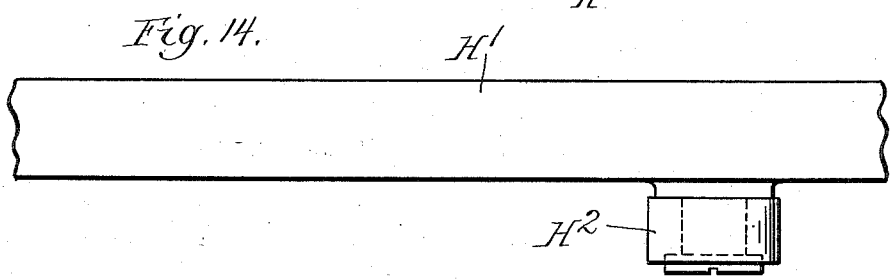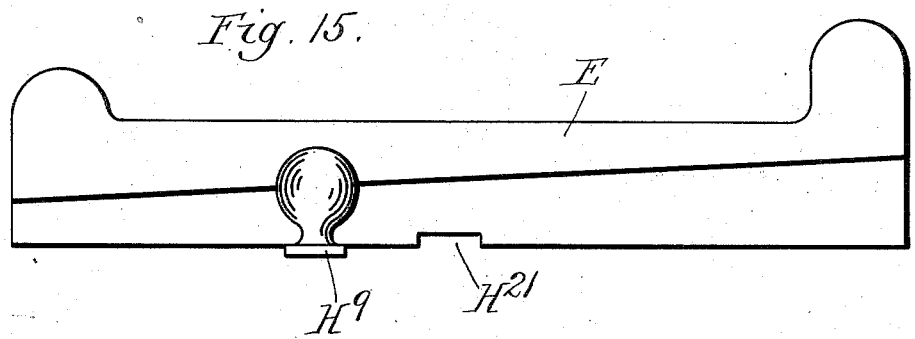

WALLACE B. WOLFF, OF CHICAGO, ILLINOIS, AND ERNEST K. HOOD, OF INDIANAPOLIS, INDIANA, ASSIGNORS TO AMERICAN SLICING MACHINE COMPANY, OF CHICAGO, ILLINOIS, A CORPORATION OF ILLINOIS.

SLICING-MACHINE.

1,228,509. Specification of Letters Patent. Patented June 5, 1917.

Application filed March 31, 1915. Serial No. 18,212.

*To all whom it may concern:*

Be it known that we, WALLACE B. WOLFF and ERNEST K. HOOD, citizens of the United States, residing, respectively, at Chicago, in the county of Cook and State of Illinois, and at Indianapolis, in the county of Marion and State of Indiana, have invented a certain new and useful Improvement in Slicing-Machines, of which the following is a specification.

Our invention relates to improvements in slicing machines for cutting and slicing meat, bread or other products. It is illustrated more or less diagrammatically in the accompanying drawings wherein, Figure 1 is a plan view;

Fig. 2 is a section along the line 2—2 of Fig. 1;

Fig. 3 a detailed view of levers;

Fig. 4 a side elevation of a portion of the machine;

Fig. 5 is a section along the line 5—5 of Fig. 2;

Fig. 6 is a section of feed adjusting mechanism;

Fig. 7 is a detail section along the line 7—7 of Fig. 6;

Fig. 8 is a section along the line 8—9 of Fig. 6;

Fig. 9 is a section along the line 8—9 of Fig. 6;

Fig. 10 is a detail plan view in part section and with parts broken away of the reciprocating and feed carriages;

Fig. 11 is a detail in part section of the feed clutch mechanism;

Fig. 12 is a sectional view of the modified form of feed mechanism;

Fig. 13 is a detail of same;

Fig. 14 a detail of the modified feed box;

Fig. 15 a detail of the modified throw out lever lock.

Like parts are indicated by similar letters throughout the several figures.

A is a combined machine housing and base. It contains a vertical driving shaft $A^1$ on which are mounted two concentric miter gears $A^2$, $A^3$. In mesh with the gear $A^3$ is a miter pinion $A^4$. This miter pinion $A^4$ is mounted on a shaft $A^5$, which projects through the base A into the knife drive housing $A^6$, which housing contains any suitable drive mechanism not here shown for transmitting power from the shaft $A^5$ to the rotating cutting knife $A^7$ which is mounted for rotation in a vertical plane to one side of the housing $A^6$. This knife is partially inclosed and protected by the usual form of fixed guard $A^8$, supported by an arm $A^9$, having an extension $A^{10}$. $A^{11}$ is a bracket projecting from the housing $A^6$. Upon it is pivotally mounted an arm $A^{12}$, which carries, held rigidly therein, a vertical bar $A^{13}$. On this bar is mounted a curved scraper $A^{14}$ adapted to lie immediately behind the cutting edge of the knife, a scraper $A^{15}$ adapted to engage the cutting edge of the knife, and a guard $A^{16}$ projecting outwardly and downwardly from the upper end of the rod $A^{13}$ substantially concentric with the edge of the knife, but curved slightly away therefrom toward the bottom to engage a bracket $A^{17}$ to yieldingly hold all the parts in fixed relation with the knife. $A^{20}$ is a meat tray attached to the housing beneath the cutting point of the knife to catch the material cut off by the knife.

B is the reciprocating carriage mounted for travel along the round track bar $B^1$, and the guiding track $B^2$. $B^3$ is a shoe on the reciprocating carriage B, which rests on the track $B^2$, and $B^4$ is a split sleeve inclosing the rod or bar $B^1$. $B^5$ is a link pivoted at one end on the sleeve $B^4$ at the other end on the crank $B^6$, which crank is on the drive shaft $A^1$.

C is a shaft having on one end a pinion $C^1$ in mesh with the gear $A^2$. It is rotatably mounted in a control sleeve $C^3$ at its outer end, which sleeve is in turn mounted in a bearing $C^4$ in the housing A. The shaft C passes on through the sleeve $C^3$, and has on its extreme outer end a driving or fly wheel $C^5$. The fly wheel hub has rigidly attached thereto a driving clutch plate $C^6$. In engagement with said driving clutch plate is a driven clutch plate $C^7$, having a spring held friction contact $C^8$ engaging the driving plate $C^6$. The outer periphery of the driven plate is marked or indexed as indicated at $C^9$, and this driven plate may be rotated for adjustment with respect to the driving plate by means of the hand wheel $C^{10}$. The hub of $C^7$ contains a screw $C^{12}$, which engages the sleeve $C^3$ to insure rotation of the sleeve and plate in unison.

D is a cam plate carried by the control sleeve, having an eccentric cam slot $D^1$ in the face thereof. This eccentric cam slot is engaged by a pin $D^2$ on the adjustable eccentric $D^3$, which eccentric is slidable on, but compelled to rotate with the hub $D^4$ on the shaft C. This eccentric is slotted at $D^5$ to permit free reciprocation in a plane perpendicular to the axis of the shaft in response to the position of the cam plate. $D^6$ is a feed lever fulcrumed in the housing A, having a contact member $D^7$ in engagement with the eccentric $D^3$, and having at its upper end a roller contacting plate $D^8$.

E is a feed carriage, which feed carriage is mounted for slidable movement in a horizontal plane on the reciprocating carriage B, along a line perpendicular to the line of movement of such carriage. $E^1$ is a removable meat plate mounted on the feed carriage. $E^2$ is a cover plate, covering the top of the reciprocating carriage B and inclosing a portion of the feed carriage E and the driving mechanism. The feed carriage E rides along the track $E^3$ on a reciprocating carriage B, being held in position thereon by the guide member $E^4$. $E^5$ is a bracket downwardly projecting from the feed carriage E. It carries the square drive rod $E^6$ in rigid connection with the feed carriage. $E^9$ is a contact locking strip rigidly attached to the feed carriage parallel with to one side of and slightly above the square drive bar or shaft $E^6$.

F is a feed block grooved as indicated to make room for the square bar $E^6$. It carries the feed roller $F^1$ in opposition to the roller contacting plate, $D^8$, on the feed lever $D^6$. $F^2$ is a clutch ball in the feed block in oposition to one side of the square drive shaft $E^6$ and yieldingly pressed against it by the spring $F^3$. $F^4$ is a trip lever pivoted on the feed block F, having a finger $F^5$ in engagement with the ball $F^2$, and an outwardly projecting hand control arm $F^6$ passing through the base or carriage B, and adapted to move back and forth in unison with the feed block. $F^7$ is an anchor block rigidly mounted on the carriage B. It carries a clutch ball $F^8$ in engagement with the strip $E^9$ rigidly thrust thereagainst by the spring $F^9$ to resist a rearward movement of the strip $E^9$ and the feed carriage. It will be understood of course that any rearward movement will tend to clamp the ball and so lock it. $F^{11}$ is a control arm for such ball clutch having a ball contacting finger $F^{12}$, and downward extension $F^{13}$ projecting into the path of the finger $F^4$. $F^{20}$ is a pin projecting forwardly from the feed block F surrounded by a spring $F^{22}$ which tends yieldingly to resist the forward movement of the feed block, and tends always to thrust it back to the starting position after it has been displaced therefrom.

Referring to Fig. 3, G is a trip lever. It is pivoted on the carriage B. One end extends downwardly into the plane of the finger $F^4$, the other end extends upwardly into the plane of the pin $G^1$, which pin is mounted on the feed carriage E. When the feed carriage is in the position shown in Fig. 3 the lever G is thrust over and engages the finger $F^4$ and throws it into the dotted line position shown in Fig. 11 also throwing the finger $F^{11}$ into the dotted line position shown in Fig. 10, thus disengaging the two ball clutches and stopping the feed and leaving the feed carriage free to be retracted by the operator. This same effect may be had by the operator who himself can move back the part $F^6$ until the parts assume the dotted line position, when he will then be able to move the carriage back and forth as he chooses.

In the modification shown in Figs. 12 to 15, the result obtained is substantially the same as that above indicated.

H is a supporting slotted plate mounted on the feed carriage B. It carries and forms a guide for the feed bar $H^1$, having a roller $H^2$. The forward movement of the feed bar H is yieldingly resisted by the spring $H^4$. $H^5$ is a slotted clutch block mounted on feed carriage E. The square shaft $H^1$ passes through this slot and is adapted to be engaged by the clutch ball $H^7$ thrust into operative position by the spring $H^8$. $H^9$ is a control lever pivoted on the feed carriage E having a head $H^{10}$. $H^5$ is also slotted to permit passage of the brake strip $H^{12}$ mounted on the reciprocating carriage, which strip projects from the plate H. $H^{13}$ is a ball clutch engaging such strip to prevent rearward movement of the feed carriage E.

It will be evident that we have shown in our drawings an operative device, still many changes might be made both in size, shape and arrangement of parts without departing from the spirit of our invention, and we wish, therefore, that our drawings be regarded as in a sense diagrammatic.

The slotted clutch block $H^5$ carries a plunger $H^{14}$ provided with a head $H^{15}$ which engages with the throw-out lever $H^9$. A spring $H^{16}$ normally holds the plunger against nut $H^{17}$. On each end of the head $H^{15}$ are mounted adjusting screws $H^{18}$ which pass partly through $H^5$ and in an engaging position with balls $H^7$ and $H^{13}$. $H^{20}$ is an adjusting nut carried by the forward end of plunger $H^{14}$ and is designed to strike against plate H thus disengaging the two ball clutches and stopping the feed and leaving the feed carriage free to be retracted by the operator. This disengaging can also be accomplished by moving throw-out lever H⁹ to the right until this lever drops into slot H²¹ on feed carriage E. H²² are threaded plugs designed to vary the tension of the clutch ball springs.

The use and operation of our invention are as follows:—

The crank or fly wheel is rotated by hand or motor or by any other suitable means not here shown and this rotation results in the rotation of the vertically disposed crank shaft and thus drives the reciprocating carriage back and forth along its guide rails in the usual manner. Meanwhile since the cutting knife is coupled up in the same system the knife rotates and if there is any meat on the meat plate resting on the feed carriage it will be carried back and forth across the edge of the cutting knife so the knife can cut it off. If meat is to be sliced, however, the meat must be fed forward toward the knife once for each reciprocation of the reciprocating carriage so that the meat will be brought up after each slice into position where another slice can be cut. It will be noted that the feed carriage is slidably mounted on the reciprocating carriage and that the meat carriage is removably mounted but held for feeding movement in position on the feed carriage.

The rotation of the drive shaft is a fixed quantity. The rotation of the crank shaft, the reciprocation of the reciprocating carriage and the rotation of the cutting knife all take place in unison with and in response to the rotation of the drive shaft. If now the feed of the meat along the reciprocating carriage toward the plane of the knife edge is also responsive to and in unison with the rotation of the drive shaft the meat feed will be properly timed against and with respect to the reciprocatory movement of the reciprocating carriage.

Since it is desirable to cut slices of different thickness the feed may be changed so that when it is desired to cut thick slices a large feed takes place. If it is desired to cut thin slices a short feed takes place and means are provided for varying the length of the feed without varying any of the other consonants.

The drive shaft carries an eccentric. This eccentric may be moved back and forth in a plane perpendicular to the shaft and always rotates with the shaft. In opposition to it is a feeding arm. By turning the control sleeve the cam slot therein may be made to move the eccentric out or withdraw it toward the central position so as to change the length of the stroke made by the feeding arm. This is done by giving the hand wheel on the driven clutch plate a movement toward the right or toward the left-hand as the case may be with respect to the drive shaft until the proper eccentricity of the eccentric is obtained. The frictional parts and the hand wheel and the guide sleeve retain such position that at every revolution of the crank shaft the lever will be made to make one stroke of the proper length. It will be noted that the upper end of the lever is a plate. This plate is in the path of the roller on the feed block on the reciprocating carriage. The roller can be in engagement with the contacting plate. The plate on the lever is comparatively long so that there is ample time for it to operate on the roller to move it forward the desired length and stroke during the operation of the stroke when the roller is moving from the nearest end of the roller plate to the end of its excursion and back thus the forward feed movement of the feed carriage is directly responsive to the rocking of this lever and this lever is directly responsive to the rotation of the drive shaft.

It will be observed that the block which carries the roller is free to move back and forth in a line at right angles to the line of movement of the reciprocating carriage. It moves forward responsive to the lever and is thrust back by the spring. When it moves forward the ball clutch thereon grips the feed bar on the feed carriage instantly and causes it to move forward to the same distance as the block itself. When the block is no longer forced by the lever it will be noted that the other bar clutch grips the strip projecting from the feed carriage and holds it so that the feed carriage cannot return. There is no tendency for the feed carriage to move forward and if it did tend to move forward it would be arrested by the feed block which is thrust back by the spring. It will be obvious that each full rotation of the drive shaft which results in a complete reciprocation of the carriage results also in one feeding movement and that feeding movement will thus be long or short depending on the throw of the eccentric and that feeding movement of the feed block will continue as long as the drive shaft is rotated. However, after a certain number of movements the carriage reaches a point at which it can no longer go forward without damage and at this point the pin on the carriage strikes the lever on the reciprocating carriage and forces it over until that lever assumes the position shown in Fig. 10. At this point it thrusts the stop finger back and disengages the two bar clutches so that the feed carriage stays at rest while the reciprocating head block moves back and forth and the carriage can thus not be fed beyond the trip point. If at this point the operator desires to manually position the carriage he may do so through the two clutches when the feed carriage can be moved back and forth freely.

The use and operation of the modified forms shown in Figs. 12 to 15 inclusive is substantially the same except that the relative position of the parts is reversed.

We claim:

1. A slicing machine comprising a reciprocating carriage, a feed carriage mounted for movement therealong, a power shaft and a driving connection between it and the reciprocating carriage, an eccentric cam mounted on the power shaft, means for varying the eccentricity of said cam, a feed lever controlled at one end by the eccentric cam, and means responsive to the rocking of this feed lever for feeding the feed carriage forward along the reciprocating carriage.

2. The combination with a reciprocating carriage of a driving power shaft therefor, a feed carriage mounted for movement therealong, a lever mounted for oscillation adjacent one end of the excursion of the reciprocating carriage, an adjustable cam mounted on the power shaft in opposition to one end of said lever, a tappet plate on the upper end of the lever, a roller slidable upon the reciprocating carriage in opposition to said plate, and a clutch interposed between the roller and the feed carriage.

3. The combination with a reciprocating carriage of a driving power shaft therefor, a feed carriage mounted for movement therealong, a lever mounted for oscillation adjacent one end of the excursion of the reciprocating carriage, an adjustable cam mounted on the power shaft in opposition to one end of said lever, a tappet plate on the upper end of the lever, a driving member mounted on the reciprocating carriage in engagement with the feed carriage and in opposition to the tappet plate.

4. The combination with a reciprocating carriage of a driving power shaft therefor, a feed carriage mounted for movement therealong, a lever mounted for oscillation adjacent one end of the excursion of the reciprocating carriage, an adjustable cam mounted on the power shaft in opposition to one end of said lever, a tappet plate on the upper end of the lever, a roller slidable upon the reciprocating carriage in opposition to said plate, a clutch interposed between the roller and the feed carriage, clutch means for resisting rearward movement of the feed carriage, and a trip for arresting the operation of the clutch when the feed carriage has reached the predetermined limit of its movement.

5. The combination with a reciprocating carriage of a driving power shaft therefor, a feed carriage mounted for movement therealong, a lever mounted for oscillation adjacent one end of the excursion of the reciprocating carriage, a cam mounted on the power shaft in opposition to one end of said lever, a tappet plate on the upper end of the lever, a roller slidable upon the reciprocating carriage in opposition to said plate, and a clutch interposed between the roller and the feed carriage, clutch means for resisting rearward movement of the feed carriage, and a trip for arresting the operation of the clutch when the feed carriage has reached the predetermined limit of its movement.

6. The combination with a carriage and a support along which it is free to move of a clutch in opposition to the carriage, said clutch being free to move in one direction with respect to the carriage, but held against movement in the other direction with respect to it, and means for reciprocating said clutch to move the carriage, said clutch comprising a slotted block, a ball carriage therein, a member on the carriage in said slot and yielding means for thrusting said ball diagonally against said member to wedge it and the ball together.

7. The combination with a reciprocating carriage and means for driving it, a feed carriage mounted thereon, a clutch interposed between the driving means and the feed carriage for driving the carriage, and means mounted on the reciprocating carriage in opposition to the feed carriage for disengaging said clutch when the feed carriage reaches the end of its excursion, said means comprising a pivoted lever, a clutch engaging lever in engagement with one end of said pivoted lever, and a contact member on the feed carriage in engagement with the other end thereof.

8. The combination with a movable carriage and a support along which it travels of a ball clutch in engagement with a portion of said carriage, means for reciprocating said ball clutch to move the carriage forward, and yielding means comprising a similar clutch for arresting the rearward motion of said carriage, and manually operative means for rendering said clutches inoperative.

9. The combination with a movable carriage and a support along which it travels of a ball clutch in engagement with a portion of said carriage, means for reciprocating said ball clutch to move the carriage forward, and yielding means for arresting the rearward motion of said carriage, said yielding means comprising a similar fixed ball clutch, and manually operative means for rendering said clutches inoperative.

10. The combination with a reciprocating carriage of a driving power shaft therefor, a feed carriage mounted for movement therealong, a lever mounted for oscillation adjacent one end of the excursion of the reciprocating carriage, an adjustable cam mounted on the power shaft in opposition to one end of said lever, a tappet plate on the upper end of the lever, a driving member mounted on the reciprocating carriage in engagement with the feed carriage and in opposition to the tappet plate, and means for adjusting the throw of the cam to vary the movement of the driving member in response to the movement of the tappet plate.

11. In a slicing machine a reciprocating carriage a feed plate thereon, a drive shaft, means responsive thereto for reciprocating the carriage, means for feeding the plate along the carriage, an operative connection between the drive shaft, and such means comprising a lever and an adjustable cam on the shaft.

12. In a slicing machine a reciprocating carriage a feed plate thereon, a drive shaft, means responsive thereto for reciprocating the carriage, means for feeding the plate along the carriage, an operative connection between the drive shaft and such means comprising a lever and an adjustable cam on the shaft, said cam being held against rotation with respect to said shaft, means for moving it transversely in a plane perpendicular to said shaft.

13. In a slicing machine a reciprocating carriage, a feed plate thereon, a drive shaft, means responsive thereto for reciprocating the carriage, means for feeding the plate along the carriage, an operative connection between the drive shaft and such means comprising a lever and an adjustable cam on the shaft, and cam adjusting controlling and supporting means comprising a sleeve, a cam member carried by said sleeve having an eccentric cam slot therein, a pin carried by the adjustable cam in engagement with said slot.

14. In a slicing machine a reciprocating carriage, a feed plate thereon, a drive shaft, means responsive thereto for reciprocating the carriage, means for feeding the plate along the carriage, an operative connection between the drive shaft, and such means comprising a lever and an adjustable cam on the shaft, a wheel carried by the shaft, a sleeve rotatable on the shaft, a wheel mounted on the sleeve in opposition to the wheel on the shaft and means for moving said wheels with respect one to another and independent of the rotation of the shaft.

15. In a slicing machine having a reciprocating carriage, a feed plate and means for moving it along the carriage, a clutch interposed between the feed plate and the moving means and means carried by the reciprocating carriage in the path of a part of the feed plate for tripping said clutch when the feed plate has reached a predetermined position, together with manually controlled means for tripping the clutch at all positions of the plate.

16. In a slicing machine a drive shaft, a carriage, and means for reciprocating it responsive to the rotation of the drive shaft, a feed plate and means for feeding it along the carriage, driving means therefor interposed between the feed plate and the shaft, said driving means comprising in part a cam upon the shaft and means mounted on the shaft and operatable by the operator without interfering with and independent of the rotation of the shaft for changing the adjustment of said cam to change the feed of the plate.

17. In a slicing machine a drive shaft, a carriage, and means for reciprocating it responsive to the rotation of the drive shaft, a feed plate and means for feeding it along the carriage, driving means therefor interposed between the feed plate and the shaft, said driving means comprising in part a cam upon the shaft and means mounted on the shaft and operatable by the operator without interfering with and independent of the rotation of the shaft for changing the adjustment of said cam to change the feed of the plate, the combination with such means of a fixed wheel on the shaft, and an indicator mounted for movement with such means in register with said wheel to indicate the amount of feed.

Signed at Chicago in the county of Cook and State of Illinois, this 10th day of March, 1915.

WALLACE B. WOLFF.
ERNEST K. HOOD.

Witnesses:
BESSIE S. RICE,
MINNIE M. LINDENAU.